(No Model.)
C. L. HIGGINS.
VULCANIZING MOLD.
No. 590,573. Patented Sept. 28, 1897.
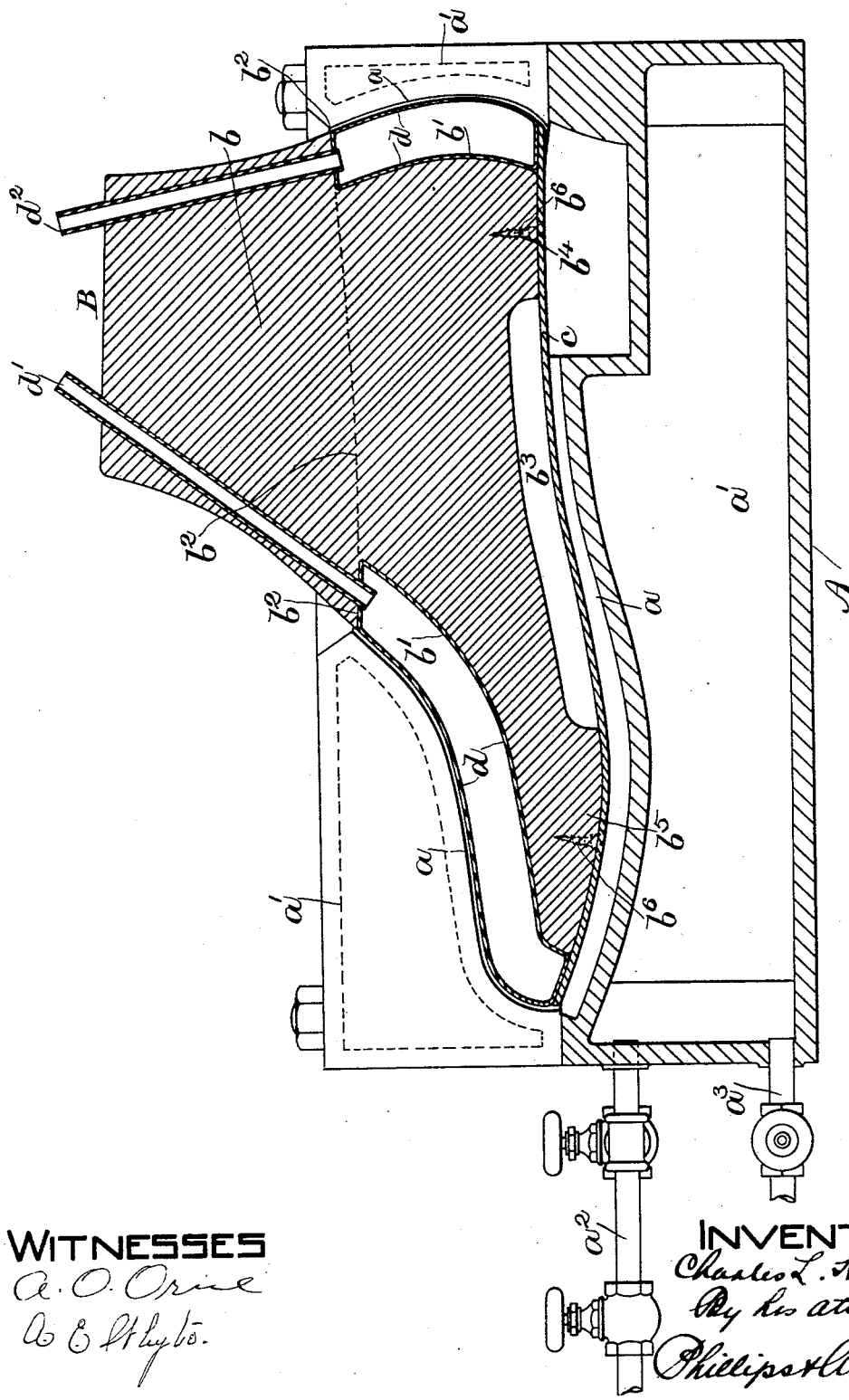
WITNESSES
A. O. Orne
A. E. Plyto.
INVENTOR
Charles L. Higgins,
By his attorneys,
Phillips + Anderson

UNITED STATES PATENT OFFICE.

CHARLES LEANDER HIGGINS, OF MONTREAL, CANADA.

VULCANIZING-MOLD.

SPECIFICATION forming part of Letters Patent No. 590,573, dated September 28, 1897.

Application filed December 21, 1896. Serial No. 616,381. (No model.)

*To all whom it may concern:*

Be it known that I, CHARLES LEANDER HIGGINS, a subject of the Queen of Great Britain, residing at Montreal, in the Province of Quebec, in the Dominion of Canada, have invented certain new and useful Improvements in Vulcanizing-Molds; and I do hereby declare the following to be a full, clear, and exact description of the invention, such as will enable others skilled in the art to which it appertains to make and use the same.

The present invention relates to vulcanizing-molds for rubber articles, and more especially to such molds which are used in the manufacture of rubber boots, shoes, gloves, &c.

As rubber articles of the class mentioned are now constructed they are built up from unvulcanized rubber upon a form, tree, or last, and such form, tree, or last with the article thereon is placed within a vulcanizing-mold capable of being heated to vulcanize the article being made and secure the parts together. In this process the form, tree, or last is the male member of the die or mold and gives the shape and set to the interior of the article, the female die or mold shaping the exterior or outer surface of the article.

It is apparent that the form, tree, or last, when acting as the inner mold member, must be shaped with great accuracy relatively to the molding-surface of the female mold in order to secure a perfect article, and it is found in practice that it is almost impossible to so fit these forms, trees, or lasts to the female molds that they will produce a perfectly-shaped article or an article which will be free from blisters or other imperfections.

The object of the present invention is to produce a vulcanizing-mold for the manufacture of rubber articles wherein equal pressure will be brought upon all parts of the article being made, and more particularly at the seams or joints in such article, and one which will accurately press and shape the article and cause it to closely contact with the inner surface of the female mold, effectively preventing the admission of steam or water between the article and the female mold and the formation of blisters or other imperfections.

To the above end the present invention consists of a vulcanizing-mold comprising an inflatable and collapsible inner or male member; and it further consists of the devices and combination of devices which will be hereinafter described and claimed.

The invention is illustrated in the accompanying drawing, which shows a longitudinal central vertical section of the device, parts being in elevation.

Similar letters of reference indicate corresponding parts.

In the drawing, A represents the outer or female member of the mold, and B the inner or male member of the mold.

The female member A forms no part of the present invention and may be of any usual or preferred form and arrangement, it having the usual forming-surface $a$ to mold and shape the outer surface of the article being vulcanized, the sole-molding surface being embossed, as is usual in these devices, to impart an ornamental tread-surface to the sole and provided with the usual steam-chambers $a'$ and the inlet and outlet pipes $a^2$ $a^3$ for the admission of steam and water to the chambers $a'$, and is also constructed in any usual manner to be opened up for the admission therein of the inner member B and the shoe or other article thereon.

The inner member B, in the form of the present invention shown in the drawing, comprises a substantially last-shaped block $b$, which may be made of any suitable material, the lower exterior portion of which is cut away entirely around the foot portion, as shown at $b'$, leaving a projecting shoulder $b^2$, as clearly shown. The block $b$ is also preferably cut away, as shown at $b^3$, said cut extending from side to side of the block $b$, leaving at the heel and toe pressing blocks or surfaces $b^4$ and $b^5$, for a purpose to be hereinafter described.

Removably secured to the pressing-blocks $b^4$ and $b^5$ by any suitable means, such as the screws $b^6$, is a sole-shaped metallic plate $c$, which is substantially the size of the inner-sole surface of the shoe being made and which is adapted to force the rubber sole into forcible contact with the embossing-surface of the member A during the vulcanizing process and cause said sole to be ornamented as before referred to.

Secured to the foot portion of the member

B within the cut-out portion $b'$ and entirely surrounding said foot portion beneath the shoulder $b^2$ is a rubber bag $d$, which forms the inflatable and collapsible portion of the male die or former B, and which can be readily inflated and deflated by means of suitable inlet and outlet pipes $d'$ and $d^2$, which pass out of the top or ankle portion of the block $b$. In the form of the invention shown in the drawing the block $b$ below the shoulder $b^2$ sustains the rigid pressing-block $b^4$ and $b^5$, by the use of which great pressure may be applied to the sole-plate $c$, but it may be desirable in some classes of work to remove the portion of the block $b$ below the shoulder $b^2$ and form the entire foot portion of the member $b$ in the form of a rubber bag to be inflated in a similar manner to the bag $d$.

While I have in practice secured good results with the construction last suggested, I prefer to use in the manufacture of shoes a male mold having within the collapsible portion a backing-block having the general shape of the foot of the last, for the reason that the mold so constructed can be more readily inserted in the shoe and shapes itself more accurately to the interior of the shoe when inflated.

In practice I provide a number of interchangeable sole-plates $c$ of different sizes, which may be secured to the block $b$ by the screws $b^6$ or other suitable fastening. It will be noted that, as shown in the drawing, the block $b$ bears upon the sole-plate $c$ only along the pressure blocks or surfaces $b^4$ and $b^5$, the cut-away portion $b^3$ permitting the shank of the sole-plate to spring or bend more or less to conform to the varying contour of the shanks of shoes of different styles and sizes.

The operation of my invention is as follows: The shoe having been cut out of unvulcanized rubber and the parts thereof secured temporarily together by rubber cement, as is usual in the manufacture of rubber articles, the member B, with the inflatable portion $d$ deflated, is inserted into the same and the shoe and member B carefully inserted in the mold member A, which is then closed around the shoe and held closed by any suitable means. Hot air or steam is now forced into the bag $d$ through the pipes $d'$ and $d^2$, causing it to expand and force the foot portion of the shoe into close contact with the mold-face $a$, firmly pressing the lapped edges of the seams tightly together and preventing the admission of water or steam between the mold-face $a$ and the shoe. Steam is now admitted to the member A and pressure applied to the member B in any usual or convenient manner, causing the metal plate $c$ to force the sole of the shoe in close contact with the embossed surface of the mold-face $a$, and the parts are allowed to remain under the action of the steam for a sufficient length of time to insure a proper vulcanization of the rubber and a complete union of the parts forming the shoe.

It will be noted that by the use of my expansible former B, I am enabled to insure a close contact between the foot portion of the shoe and the mold-face $a$ of the mold member A, and that, therefore, the shoe will have the proper external shape and will not be blistered or otherwise marred by the accidental admission of water or steam between the shoe and the mold-face $a$, and it will further be noted that the present invention renders unnecessary the accuracy of fit which was necessary in the manufacture of the mold members as heretofore constructed.

I am aware that it has heretofore been proposed to admit air or steam into a rubber article during its vulcanization in order to force the same into contact with the mold-surface of the female mold, but in such case the air was admitted directly into the article itself, which necessitated the use of complicated devices to close the end of the article and also left the article entirely unsupported during its insertion into the mold, and in so far as I am at present advised it is new to employ an inflatable and collapsible member in a vulcanizing-mold.

I therefore claim as new and desire to protect by Letters Patent of the United States—

1. In a vulcanizing apparatus, the combination with the outer mold, of an inner mold, comprising an interior rigid backing portion and an exterior inflatable portion, substantially as described.

2. In a vulcanizing apparatus the combination with the outer mold, of an inner mold comprising a rigid backing-block and an inflatable foot portion, substantially as described.

3. In a vulcanizing-mold, the combination with an outer mold, of an inner mold comprising the rigid last-shaped backing-block cut away around the foot portion as described, and an inflatable bag in said cut away portion, substantially as described.

4. In a vulcanizing-mold, the combination of an outer mold, of an inflatable inner mold, and the sole-plate secured thereto, substantially as described.

5. In a vulcanizing-mold, the combination with an outer mold, of an inner mold comprising an inflatable portion and a rigid portion, a sole-plate, and pressure-blocks on said rigid portion arranged to bear on the fore part and heel of said sole-plate, substantially as described.

6. In a vulcanizing-mold the combination of an outer mold, of an inflatable inner mold comprising a rigid backing-block, an inflatable foot portion, and a sole-plate secured to the backing-block, substantially as described.

In testimony whereof I affix my signature in presence of two witnesses.

CHARLES LEANDER HIGGINS.

Witnesses:
JOSEPH JOHN WESTGATE,
A. D. MANN.